(12) United States Patent
Bacher et al.

(10) Patent No.: US 11,475,138 B2
(45) Date of Patent: Oct. 18, 2022

(54) CREATION AND EXECUTION OF SECURE CONTAINERS

(71) Applicant: INTERNATIONAL BUSINESS MACHINES CORPORATION, Armonk, NY (US)

(72) Inventors: Utz Bacher, Dettenhausen (DE); Reinhard Theodor Buendgen, Tuebingen (DE); Peter Morjan, Boeblingen (DE); Janosch Andreas Frank, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

(21) Appl. No.: 16/737,974

(22) Filed: Jan. 9, 2020

(65) Prior Publication Data

US 2020/0250319 A1   Aug. 6, 2020

(30) Foreign Application Priority Data

Feb. 6, 2019  (EP) .................................. 19155755

(51) Int. Cl.
*G06F 21/60* (2013.01)
*G06F 16/11* (2019.01)
*G06F 9/455* (2018.01)

(52) U.S. Cl.
CPC ........ *G06F 21/602* (2013.01); *G06F 9/45558* (2013.01); *G06F 16/116* (2019.01); *G06F 2009/45583* (2013.01)

(58) Field of Classification Search
CPC .. G06F 21/602; G06F 9/45558; G06F 16/116; G06F 2009/45583; G06F 8/63; G06F 21/53; G06F 2221/2107
See application file for complete search history.

(56) References Cited

U.S. PATENT DOCUMENTS 5,129,082 A * 7/1992 Tirfing .................... G06F 16/10
9,176,677 B1 * 11/2015 Fradkin ................ G06F 3/0631
(Continued)

FOREIGN PATENT DOCUMENTS

| CN | 101847184 A | 9/2010 |
| WO | 2018007213 A1 | 1/2018 |
| WO | 2018117966 A1 | 6/2018 |

OTHER PUBLICATIONS

Giannakopoulos, Isolation in Docker through Layer Encryption, 2017, IEEE 37th International Conference on Distributed Computing Systems, pp. 2529-2532 (Year: 2017).*

(Continued)

*Primary Examiner* — Robert B Leung
*Assistant Examiner* — Bruce S Ashley
(74) *Attorney, Agent, or Firm* — Andre L. Adkins

(57) ABSTRACT

A computer-implemented method for creating a secure software container. The method comprises providing a first layered software container image, transforming all files, except corresponding metadata, of each layer of the first layered software container image into a volume, the volume comprises a set of blocks, wherein each layer comprises an incremental difference to a next lower layer, encrypting each block of the set of blocks of a portion of the layers, and storing each encrypted set of the blocks as a layer of an encrypted container image along with unencrypted metadata for rebuilding an order of the set of blocks equal to an order of the first layered software container image, so that a secure encrypted software container is created.

25 Claims, 10 Drawing Sheets

(56) References Cited

U.S. PATENT DOCUMENTS

| | | | |
|---|---|---|---|
| 9,740,583 B1* | 8/2017 | Brandwine | G06F 11/2058 |
| 2015/0319160 A1* | 11/2015 | Ferguson | G06F 21/6281 |
| | | | 726/10 |
| 2017/0177860 A1 | 6/2017 | Suarez | |
| 2017/0364704 A1* | 12/2017 | Wright | G06F 21/6227 |
| 2018/0131723 A1 | 5/2018 | Deluca | |
| 2018/0309747 A1 | 10/2018 | Sweet | |
| 2019/0213319 A1* | 7/2019 | Gerebe | H04L 63/08 |

OTHER PUBLICATIONS

EP Application No. EP19155755.2, Filed on Feb. 6, 2019, entitled: "Creation and Execution of Secure Containers", 42 pages.
International Search Report and Written Opinion, International application No. PCT/IB2020/050789, File Reference P201802479PCT01, dated May 21, 2020, 6 pages.

* cited by examiner

CREATION AND EXECUTION OF SECURE CONTAINERS

FIELD OF THE INVENTION

The invention relates generally to a secure computing, and more specifically, to a computer-implemented method for creating a secure software container. The invention relates further to a related secure container system for creating a secure software container, and a computer program product.

BACKGROUND

These days, cloud computing continues to be one of the hottest topics in the IT (information technology) industry. Individuals as well as small and midsize companies as well as large enterprises, continue to outsource computing tasks to cloud computing providers operating large cloud computing centers. On the other side, one of the biggest concerns in the IT industry is data security. Hence, in private computing environments, i.e., enterprise compute centers, security is an important topic, so that the relevance of data and computer security in cloud computing environments is propelled to the C-level of large enterprises.

Some of the data security issues—especially in light of the new governmental data security regulations like GDPR (General Data Protection Regulation by the European Union)—may be addressed by encryption of relevant data while transmitting the data over public networks—e.g., the Internet—and/or when storing the data on storage devices. However, if the data have to be processed, the data as well as the programs may be more or less accessible by administrators of the cloud computing centers. This may be regarded as an open door for data security breaches.

One attempt to address the potential conflict between a higher usage of cloud computing resources on one side, and higher data security and data privacy requirements on the other side, is using secured virtual machines on secured computing platforms, e.g., in the form of a trusted computing environment using hardware security modules (HSM) and allowing an encryption of data as well as applications and virtual machines (VM) in tight boundaries.

On the other side, also virtual machine technology advances and one of the current technologies often used is "container computing", which may basically be seen as a plurality of applications in operating system-based scoping sandboxes without the complete overhead of an operating system within each virtual machine for each container. Thus, many general services, typically provided by an operating system and related middleware, may be shared between different containers in one operating system. However, this may have the consequence that data and programs in containers may be, from a security perspective, not managed similar to other IT resources (like virtual machines).

One of the most often used platforms for software containers is the Docker engine from Docker Inc. In Linux environments, it became quickly a standard for packaging micro-services applications, although the technology is not only limited to micro-services. Basically, it may be used to package of-the-shelf commercial and monolithic applications to provide isolation and portability properties.

In this context, a series of publications has been made: Document US 2018/0309747 A1 discloses computer systems and methods in which an agent executive running concurrently with a security module, which, when initially executed, obtains an agent API key from a user. This key is communicated to a grid computing system. An agent identity token, generally by a cryptographic token generation protocol when the API key is valid, is received from the grid and stored in a secure data store associated with the agent executive. Information that evaluates the integrity of the agent executive is collected using agent self-verification factors.

On the other side, from document WO 2018/007213 A1, a method for securely managing a Docker image is known which comprises a secure storage area storing data encrypted with a keyset. The Docker image comprises a secure driver, and the method comprises a series of steps: (i) the secure driver retrieves the keyset from a trusted store only if incoming credentials provided to the secure driver match present credentials, (ii) the secure driver accesses the secure storage area and de-cyphers the data using the keyset, and (iii) the secure driver sends the data outside the Docker image.

However, there continues to remain a gap between the elegant management of software containers on one side and security issues on the other side. Thus, it is an objective of the proposed concept to provide increased security for data and applications in software containers.

BRIEF SUMMARY

According to one aspect of the present invention, a computer-implemented method for creating a secure software container may be provided. The method may comprise providing a first layered software container image and transforming all files, except corresponding metadata, of each layer of the first layered software container image into a volume. The volume may comprise a set of blocks, wherein each layer may comprise an incremental difference to a next lower layer. The method may further comprise encrypting each block of the set of blocks of a portion of the layers, storing each encrypted set of the blocks as a layer of an encrypted container image, along with unencrypted metadata for rebuilding an order of the set of blocks equal to an order of the first layered software container image. Thereby, a secure encrypted software container may be created.

According to another aspect of the present invention, a secure container system for creating a secure software container may be provided. The secure container system may comprise a receiving unit adapted for receiving a first layered software container image, a transformation unit adapted for transforming all files, except corresponding metadata, of each layer of the first layered software container image into a volume, the volume comprises a set of blocks, wherein each layer comprises an incremental difference to a next lower layer, an encryption module adapted for encrypting each block of the set of blocks of a portion of the layers and a storage unit adapted for storing each encrypted set of the blocks as a layer of an encrypted container image, along with unencrypted metadata for rebuilding an order of the set of blocks equal to an order of the first layered software container image. Thus, the secure container system may be enabled to create a secure encrypted software container.

The proposed computer-implemented method for creating a secure software container may offer multiple advantages and technical effects:

The proposed concept delivers at least against three critical data and application security requirements. Firstly, by using techniques that conceal the contents of virtual machines including their memories from privileged administrators (even hypervisor administrators), it is achieved that from a container host perspective and its privileged system administrator nobody can look into and comprehend the content of the image of the container, i.e., the software container files. Also, access to the container, as it executes in memory, can be prevented, resulting in a confidential and secure execution of the container.

Secondly, a registry used to store container images and any of its administrators are excluded from understanding what is going on inside container images. Also, this group of people generally having—in many aspects uncontrollable—access to container images may be excluded from understanding the real contents of the managed software containers. E.g., they cannot understand and see files or executable code or data. As a third core advantage, it may be mentioned that container image attributes—like layering, used de-duplication approaches (e.g., CoW [copy on write], thin-provisioning), etc.,—and the typically handling—like typical aspects of the management of the software containers—may be preserved. The unchanged management and handling of containers may allow elevating the confidentiality level of an existing solution without changes to the overall solution, other than encrypting the container images used.

Thus, the proposed concept may allow running software container workloads in an environment to which normally privileged administrators have access and keep the confidentiality of the content of the software container images secure. Thus, also un-trusted computing environments—e.g., in which there is no trust in the system administrators—can be used and still guarantee that program code, files and data—including its main memory/RAM during execution—cannot be seen by anyone else than the creator of the software container.

This concept goes beyond a secure execution of virtual machines, which security key may only be increased for the price of a higher degree of indirection and losing the operational advantages of software containers. In the context of virtual machines it had to be acknowledged until today that without secure execution, confidentiality of the content of software containers cannot be guaranteed. The proposed concept is closing this gap and goes clearly beyond the mere protection of names spaces and even unprotected virtual machines to provide the isolated workspace for a software container.

In the following, additional embodiments of the inventive concept—applicable to the method as well as to the related system—will be described.

According to one preferred embodiment of the method, the storing each encrypted set of the blocks may also comprise storing metadata of the first layered software container image. The metadata may comprise environment variables, commands, ports to be used, etc. The metadata may be encrypted or unencrypted. However, even if the metadata are not encrypted, an unauthorized person is not able to say anything about the real content of the secure software container.

According to one advantageous embodiment of the method, each of the layers stored in the encrypted container image—i.e., as a file—may apply thin-provisioning and may also comprise thin-provisioning metadata, e.g., about which block has valid data. This may lead to the advantages of thin-provisioning in which only those storage areas are actually occupied that actually hold valid, active data.

According to one useful embodiment of the method, a name of each file of the layer of the encrypted container image is a hash value of content of the file. Thus, no additional metadata may be required. It may be assumed that by the entropy of the content on the files unique file names may be generated using this proposed method step.

According to an advantageous embodiment, the method may also comprise providing a virtual machine operating system, a start program, in particular for the secure software container and a decryption key. The decryption key may correspond to the encryption key used for the encrypting each block of the set of blocks. Thus, the secure software container can be unpacked, the layers may be brought into the original sequence and the application comprised in the secure software container may be started.

According to another advantageous embodiment, the method may also comprise providing a secure container execution environment enabled for a starting of the virtual machine with the virtual machine operating system. This way, the stack of components may be complete to actually start the execution of the application packaged into the secure software container. Moreover, the secure container execution environment may also be protected in a way that may be virtually impossible to compromise.

For completeness reasons and according to one preferred embodiment of the method, the starting of the virtual machine may comprise decrypting the encrypted container image's set of blocks using the decryption key. Only the owner of the application inside the secure software container may have access to the key. Thus, providing the decrypted version of the secure software container and the staring the required environment may be performed in one go automatically.

According to one additionally preferred embodiment, the method may also comprise rebuilding the first layered software container image in the sequence of layers of the first layered software container image. The also included metadata, indicating the original order of the layers of the unencrypted software container may be instrumental for this method step.

According to one permissive embodiment of the method, a layer on top of the decrypted secure container image—i.e., on top of the rebuilt first layered software container image—may allow read/write access wherein the layers below the top layer allow a read-only access. Thus, according to the thin-provisioning model write operations—according to the Copy-on-Write paradigm—may only be performed in the top layer in which deltas or differences to the previous version of a file is stored. A view vertically—in a virtual sense—from the top layer through all other layers toward the lowest layer would deliver all information to reconstruct the last version of the respective file.

According to one further advanced and advantageous embodiment of the method, according to claim 5, wherein the secure container execution environment is protected by a secure firmware—typically, using a hardware security module (HSM), i.e., a crypto card—preventing access to the virtual machine by privileged users and/or other processes, and wherein the virtual machine operating system, the start program and the decryption key are also each encrypted.

Thus, according to another advantageous embodiment of the method, the secure firmware cooperates with a hardware security module. This technique may deliver the most secure execution environment for virtual machines as well as applications and data in related software containers. Such a security module is a necessary requirement in order to execute the secure firmware. Without such a hardware based device, neither the secure firmware, nor the hypervisor, nor the virtual machine, nor the application(s) of the software container may be executable.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
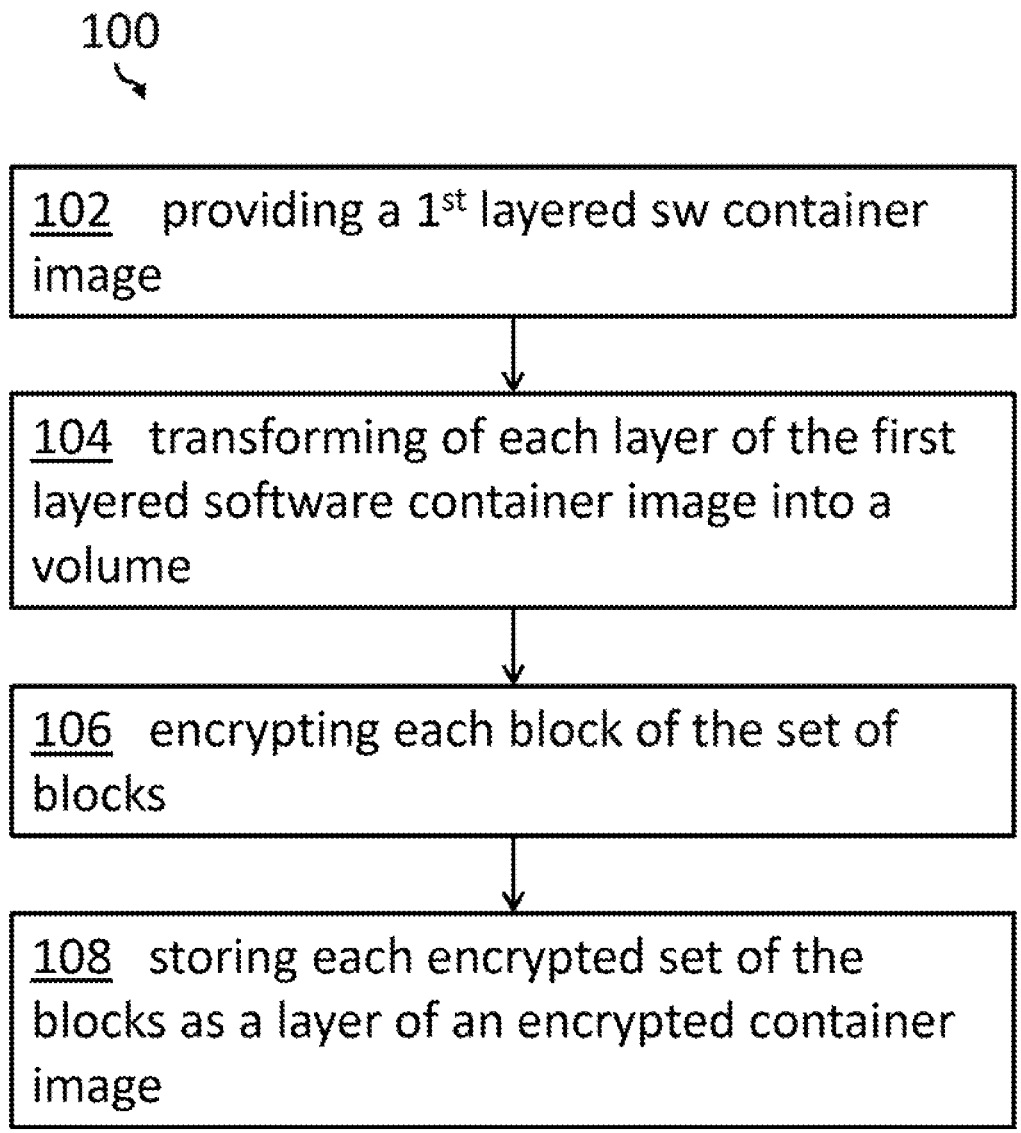

Preferred embodiments of the invention will be described, by way of example only, and with reference to the following drawings:

FIG. 1 shows a block diagram of an embodiment of the inventive computer-implemented method for creating a secure software container.

Figure 2:
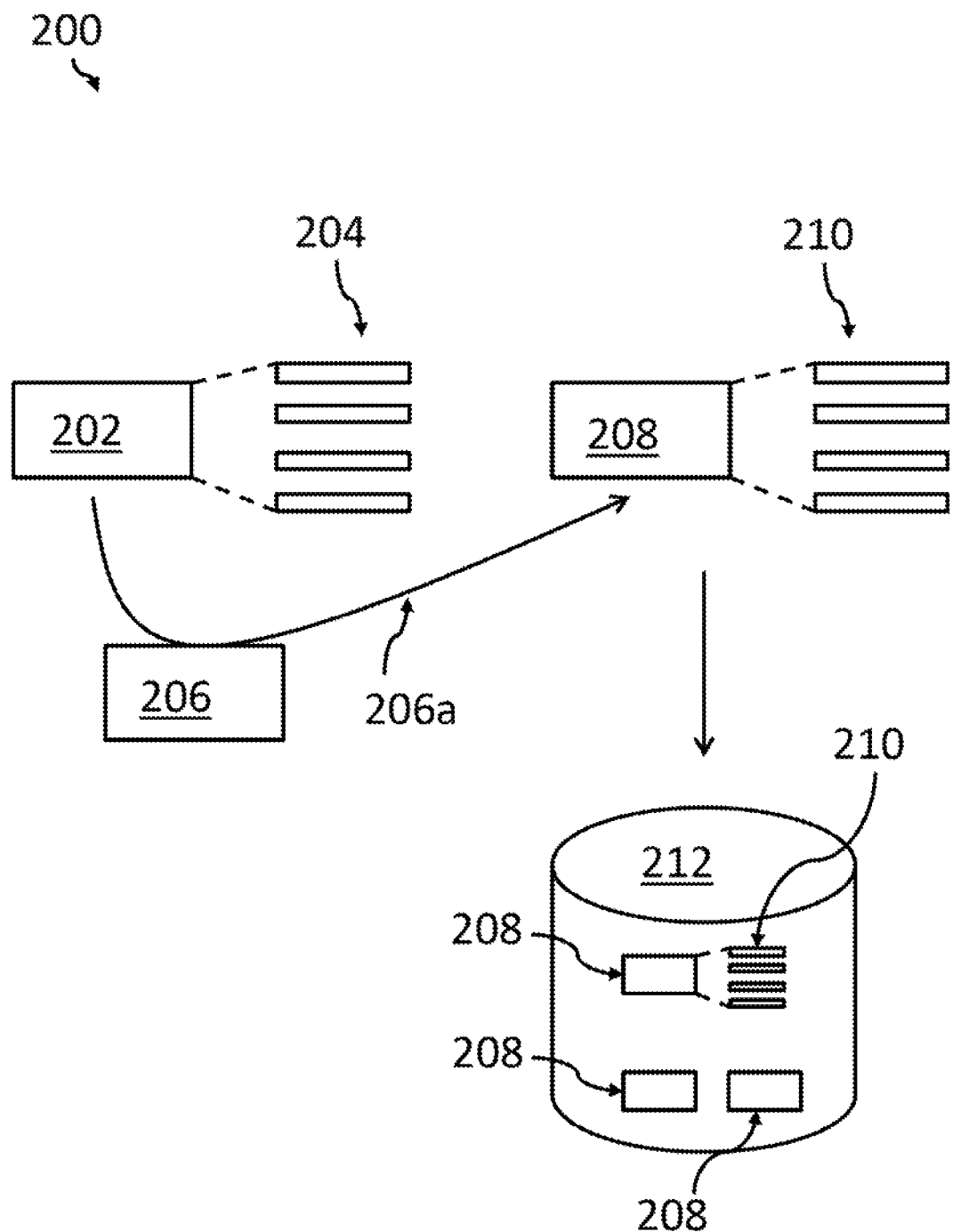

FIG. 2 shows a block diagram of the transformation process from the unencrypted software container to the encrypted software container storable in a container library.

Figure 3:
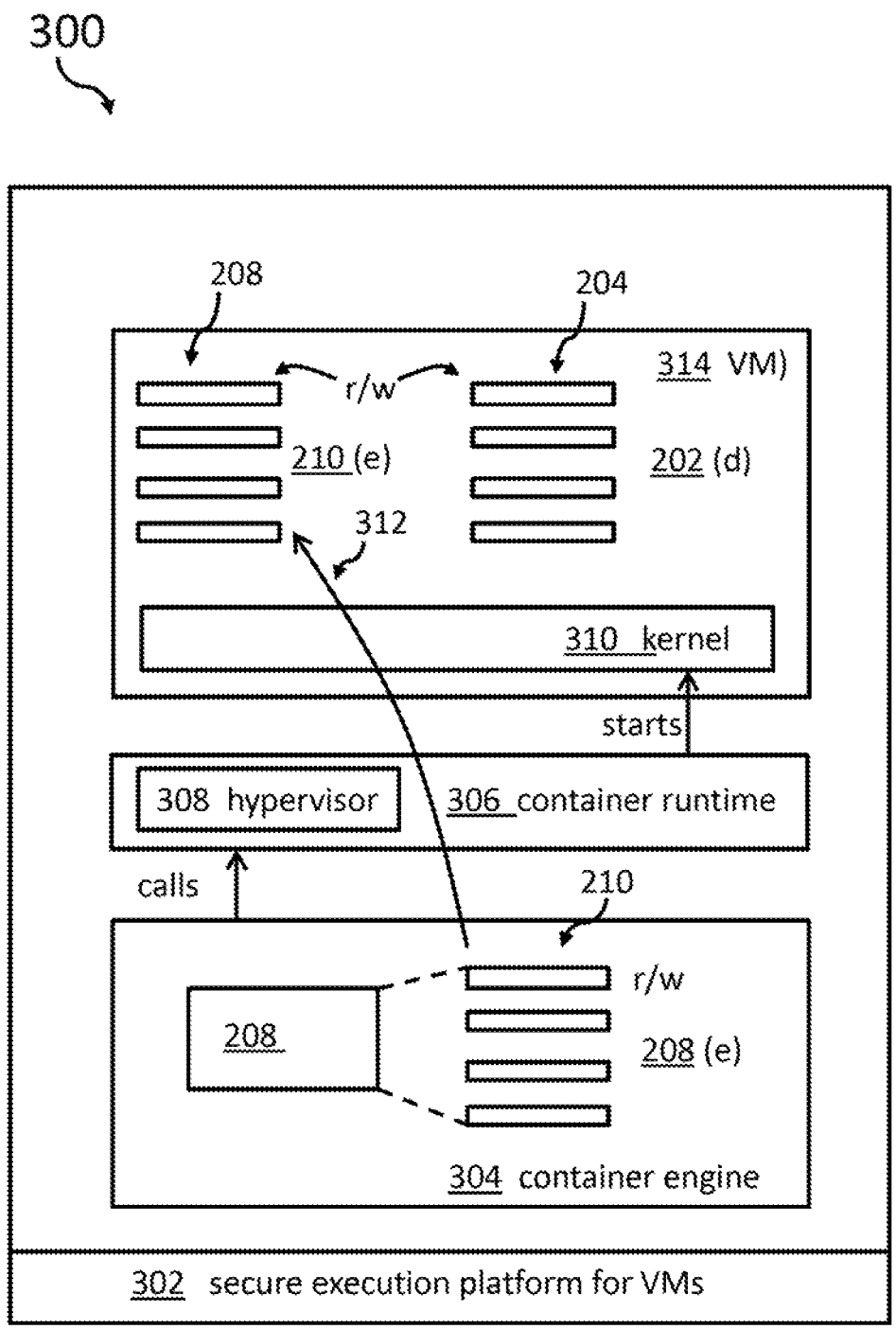

FIG. 3 shows a block diagram of an embodiment of a complete stack of involved elements for executing the secure software container.

Figure 4:
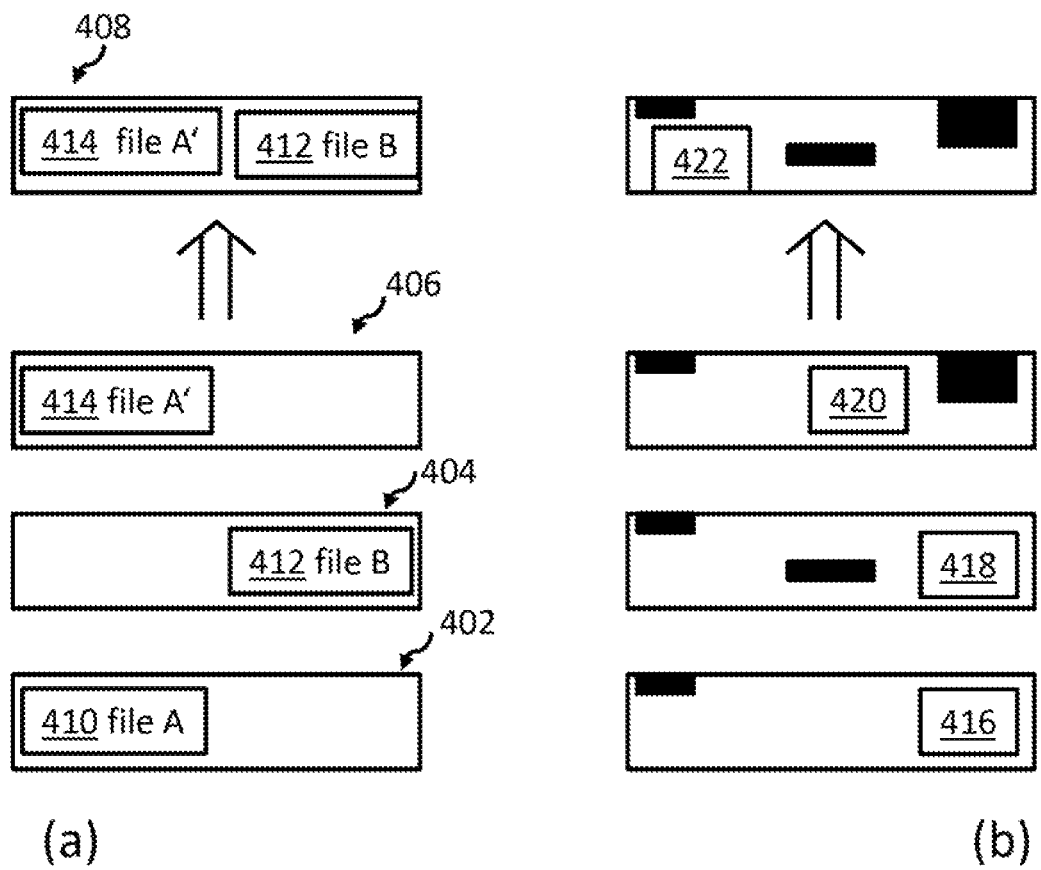
Figure 4:
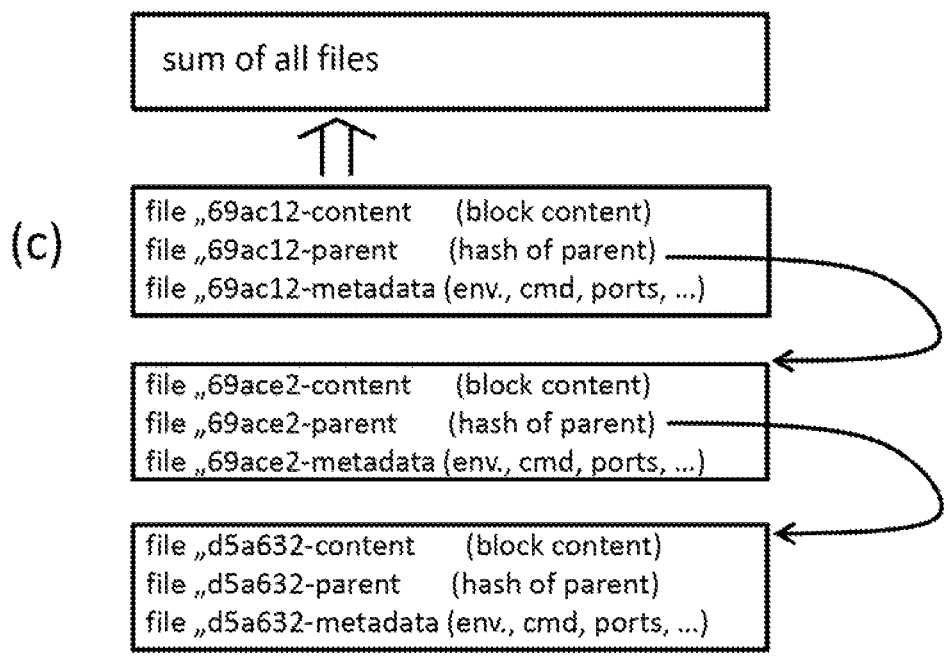

FIG. 4 illustrates thin-provisioning and the linking of blocks in the secure software container.

Figure 5:
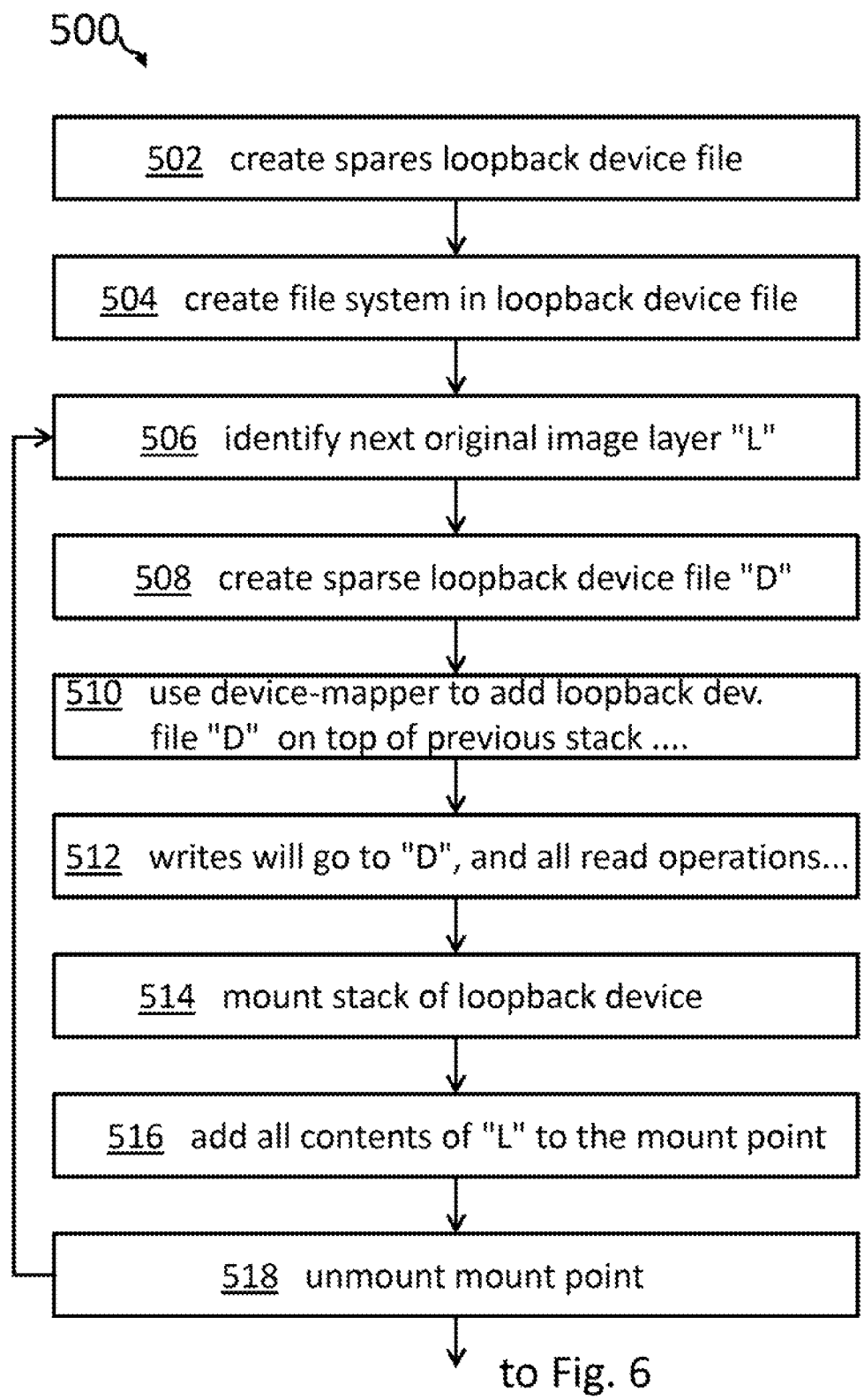

FIG. 5 shows an embodiment of a first part of a flowchart to form the secure software container.

Figure 6:
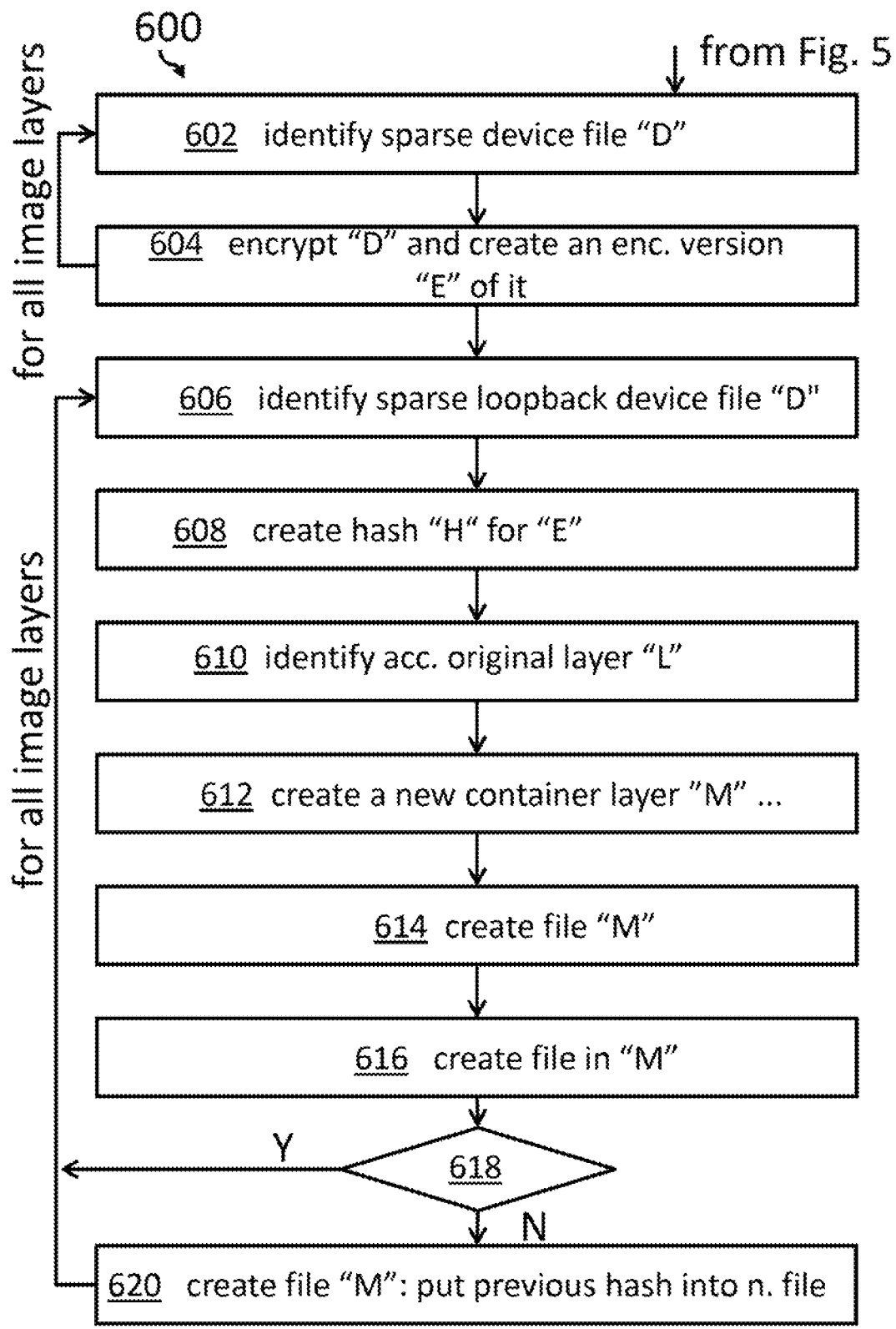

FIG. 6 shows an embodiment of the second part of the flowchart to form the secure software container.

Figure 7:
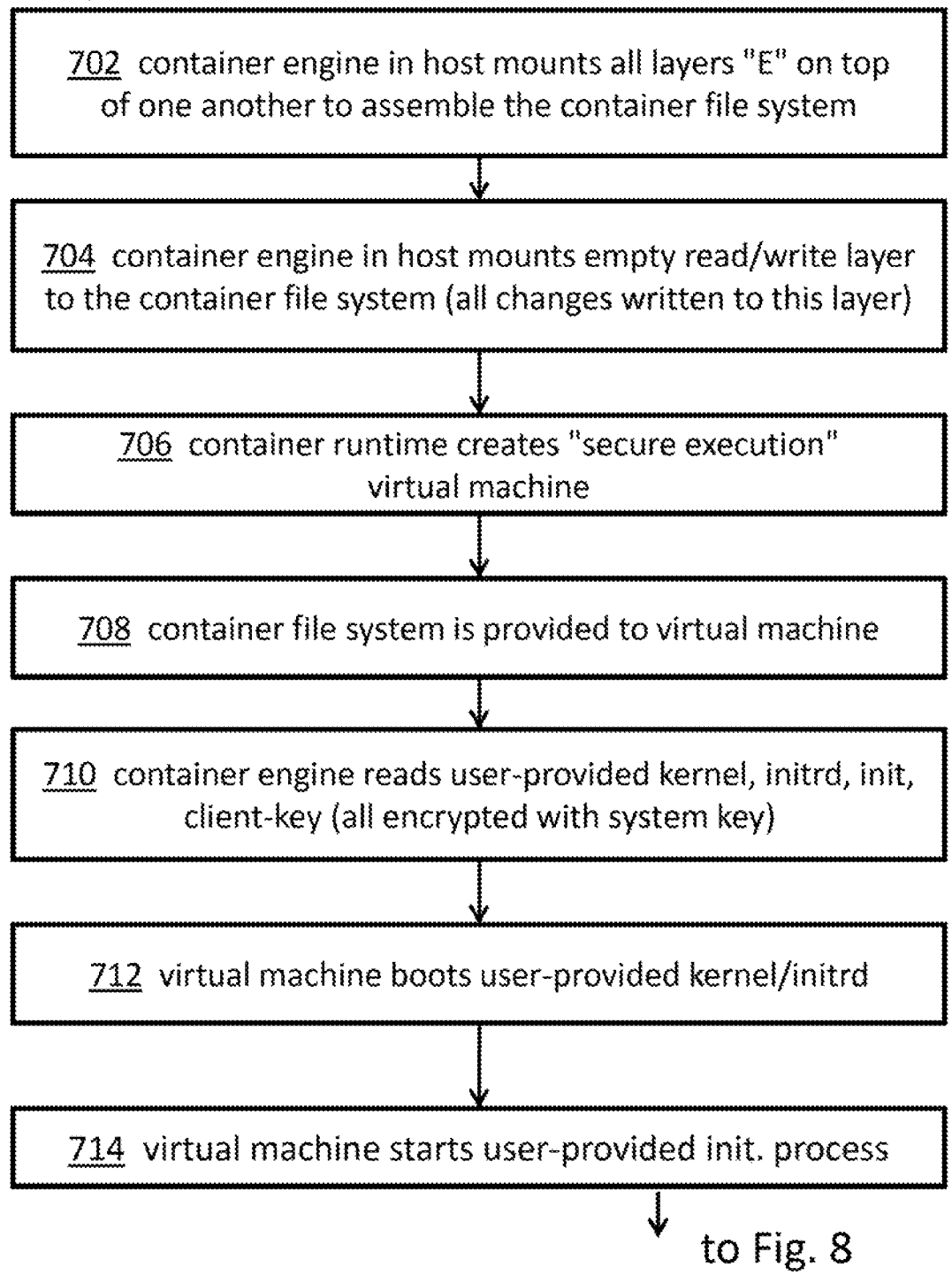

FIG. 7 shows an embodiment of a first part of a flowchart for an execution of the secure software container.

Figure 8:
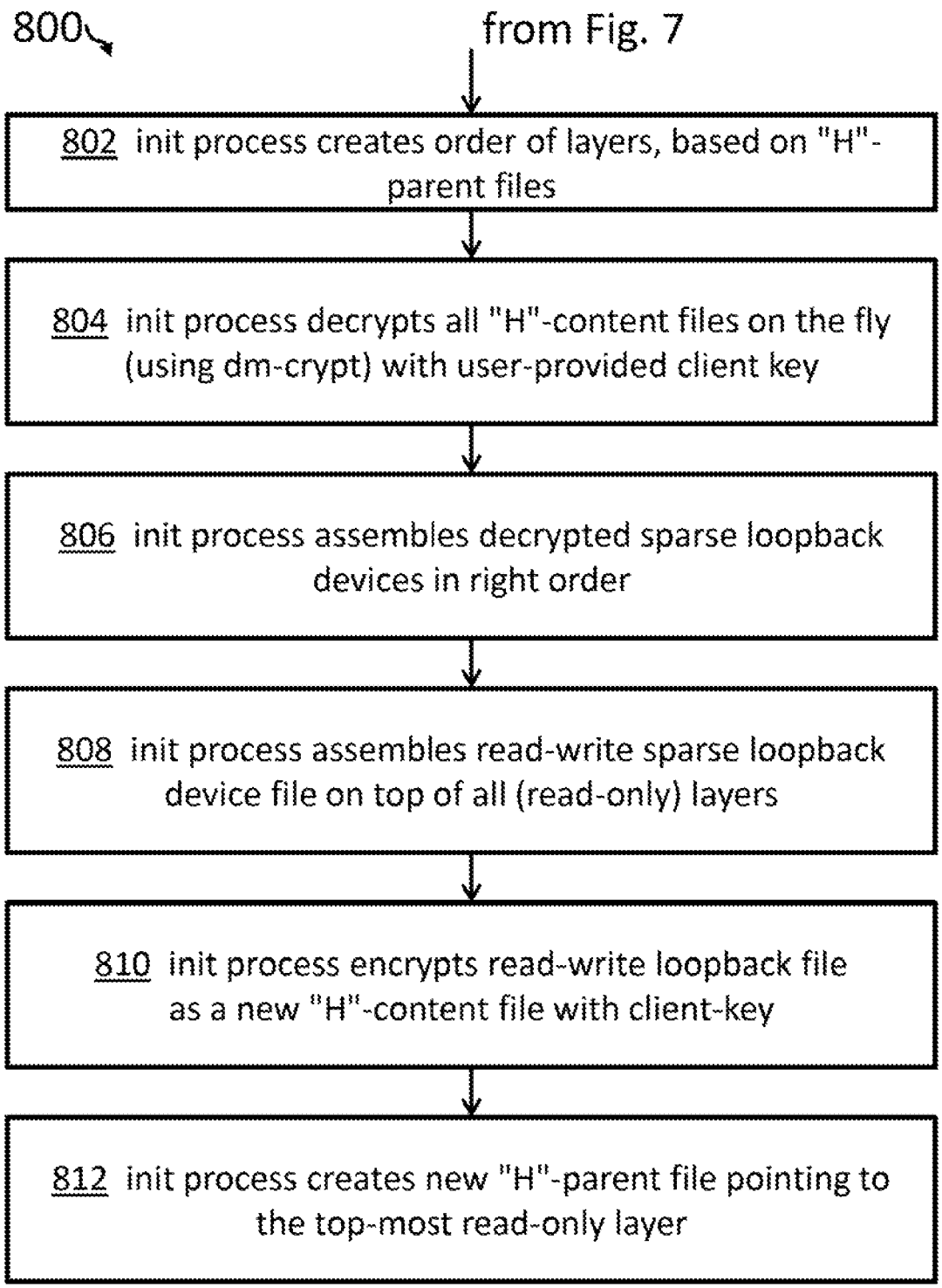

FIG. 8 shows an embodiment of the second part of the flowchart for the execution of the secure software container.

Figure 9:
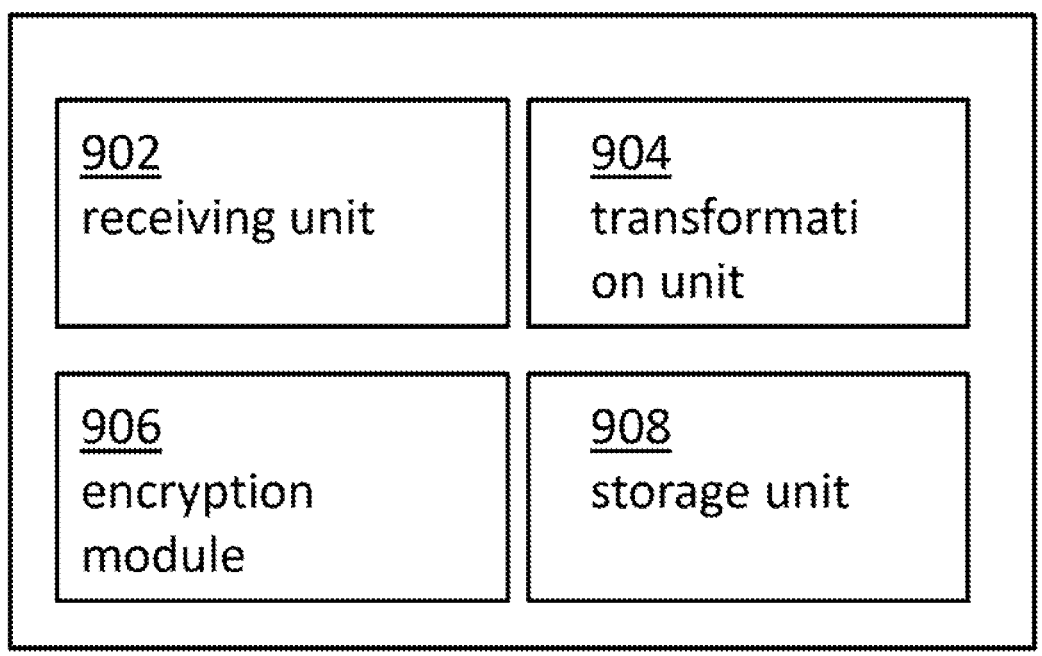

FIG. 9 shows a block diagram of an embodiment of the secure container system.

Figure 10:
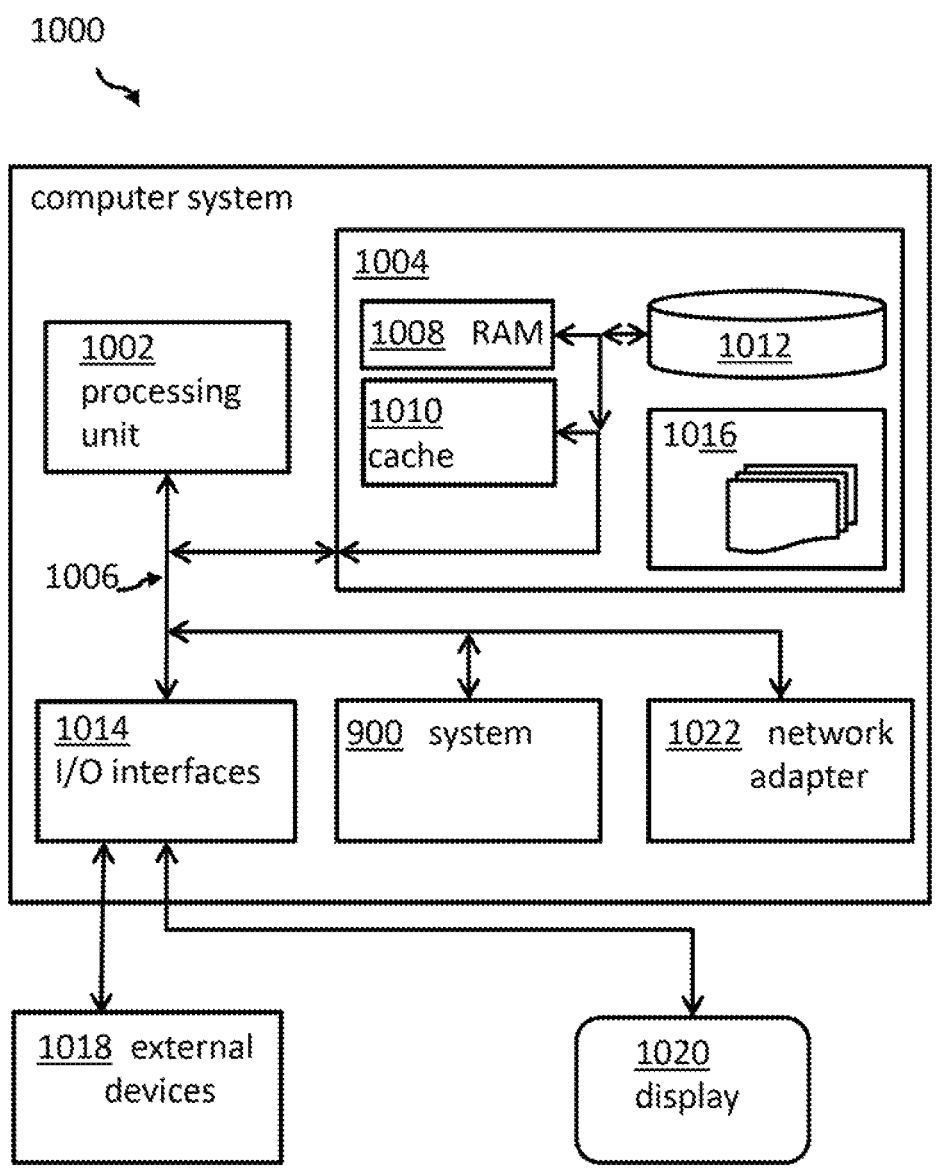

FIG. 10 shows a block diagram of a computing system comprising the secure container system.

DETAILED DESCRIPTION

In the context of this description, the following conventions, terms and/or expressions may be used:

The term 'secure software container' may denote a software container being secured against unallowed access by unauthorized personnel. Thus, the content of the software container may be encrypted so that unauthorized personnel are not able to determine what is stored inside the software container. Basically, a software container may be seen as a sandbox provided by operating system scoping mechanisms that is used to applications. Applications in these sandboxes have no visibility into the rest of the operating system or other container sandboxes. As all application sandboxes run on the same operating system instance, minimal overhead is created when running applications in container sandboxes, compared to running these applications directly as applications under the operating system. Specifically, no virtualization overhead applies. Thus, a software container may be seen—eventually together with related metadata—as only the application as executed in a container sandbox, i.e., the core function differentiating one container sandbox from another. In container technology, container images describe the immutable packaging of the application that comprises all the files that are presented to a container instance. It is the "blueprint" of the application that can be shared between container instances, and also exchanged with other container hosts. A container instances is a running container that uses a container image as the starting point of its (root) file system. Docker® may currently be seen as the leading software container technology.

It may also be noted that not all layers of a secure software container may have to be encrypted. Layers comprising common software components—e.g., components of the operating system (e.g., Ubuntu)—may remain unencrypted. These components may be common for a plurality of containers so that an encryption may not be required because their functionality may be known anyway. However, the core application blocks as well as related data may be seen as the characterizing components of the software container. Thus, these characterizing components may be encrypted as part of the secure software container. However, and for completeness reasons, it may be noted that of course all layers of the software container may be encrypted. It may also be possible to encrypt those portions that may be common to a plurality of software containers with another encryption method (e.g., only another key or also a totally different encryption method) if compared to the core part of the container, i.e., the application.

The term 'first layered software container image' may denote a stack of layers by which the software container may be defined. Storage technology used for the different layers may be based on thin-provisioning/spares storage. Application may only have write access (as well as read access) to the top layer. The layers below the top layer may be read-only.

The term 'metadata' may denote "data about data". Here, the metadata may comprise information about the different layers of the software container, in particular about the correct order of the different layers, in order to rebuild the initial software container after decrypting the block-based secure software container.

The term 'volume' may denote here a storage system in a form of a virtual storage device. It is comprised by a collection of data blocks. If the volume is virtual, all of its data is backed by a file that serves as that virtual volume. When using thin-provisioning mechanisms, unused data blocks may be marked accordingly in the volume, which can result in reduced space consumption of the file that serves a virtual volume.

The term 'set of blocks' may denote a group of storage blocks, e.g., a continuous sequence of concatenated blocks of a storage device.

The term 'incremental difference' may denote a delta between two different layers of the secure software container. The concept may typically be used in thin-provisioning concepts. The complete information (application as well as related data) may be rebuilt if the sequence of the different layers may be reflected for a sequence of new and/or updated data. To use the incremental difference concept makes it possible to use only the really required storage capacities—i.e., thin-provisioning—although the blocks per layer may virtually offer much more space (up to the storage limit of the specific layer or volume).

The term 'portion of the layers' may denote a number of layers which may be smaller than the total number of layers of the software container. As mentioned above, it may not be necessary to encrypt all layers of the software container. Some lower layers—comprising standard software components (e.g., part of an operating system)—can remain unencrypted. However, in other embodiments, also these layers may be encrypted.

The term 'encrypted container image' may denote a sequence of layers of the secure software container that may comprise the information of the first layered software container image in an encrypted form.

The term 'order of the set of blocks' may denote a sequence of blocks in order to rebuild the different layers of the secure software container.

The term 'secure encrypted software container' may denote here, the secure software container. The fact that the secure software container comprises encrypted layers may be regarded as a given within this document.

The term 'thin-provisioning' may denote using virtualization technology to give the appearance of having more physical resources than actually available. If a system always fully backs virtualized resources, all capacity have to be provided initially. The term thin-provisioning may be applied to a disk layer, but could refer to an allocation scheme for any resource. For example, real memory in a computer may typically be thin provisioned for running tasks with some form of address translation technology doing the virtualization. Each task may act as if it has real memory allocated. The sum of the allocated virtual memory may be assigned to tasks that may typically exceed the total of real memory. The same may apply for layers and a software container. Thin-provisioning may also be called "sparse volumes" in some contexts.

The term 'hash value' may denote a result of a hash function that may be used to map data of arbitrary size to data of a fixed size. The values returned by a hash function are called hash values, hash codes, digests, or simply hashes. Hash functions are often used in combination with a hash table, a common data structure used in computer software for rapid data lookup. Hash functions accelerate table or database lookup by detecting duplicated records in a large file. One such application is finding similar stretches in DNA sequences. Because a calculation of a hash value is a one-way approach, the original value may not uniquely be determined from the hash value. Thus, the technology is widely used in cryptography.

The term 'virtual machine operating system' may denote an operating system being a component of a virtual machine of a virtual server being executed on a hypervisor. Different virtual machine operating systems may not influence the other ones functions. This technology may be widely used in Linux-like operating systems. However, also mainframe and midrange operating systems may use this technology.

The term 'start program' may denote a program enabled to initiate an execution start of the secure software container. The start program may also take over the initiation of a decryption process and reordering the decrypted blocks in order to rebuild the original layers of the first layered software container.

The term 'decryption key' may denote a software component instrumental for resetting an encrypted context into its original context so that it may be read without any decryption function. Hence, it may be clear text.

The term 'secure container execution environment' may denote a software component that can accept a secure encrypted software container—or also secure encrypted software container image—and run a container instance based on it. It may choose to run the container in a virtual machine that is just created to run this container. The virtual machine may be secured so that a privileged administrator of the secure container execution environment—which also becomes a hypervisor when starting virtual machines—may not be able to access data inside the virtual machine running the container. To enable decryption of the secure encrypted software container (image), it may use a decryption key that can be provided to the (virtual machine) operating system and start the program during startup of the container instance.

The term 'hardware security module' (HSM) may denote a physical computing device that may safeguard and manage digital keys for strong authentication and provide crypto-processing. These modules may traditionally come in form of a plug-in card or an external device that attaches to a computer or network server, or the CPU directly.

The term 'Docker container' may denote one example of an operating-system-level virtualization, also known as containerization. It may denote an operating system feature in which the kernel may allow the existence of multiple isolated user-space instances. Such instances, called (software) containers, partitions, virtual environments (VEs) or jails (FreeBSD jail or chroot jail), may look like real computers from the point of view of programs running in them. A computer program running on an ordinary operating system can see all resources (connected devices, files and folders, network shares, CPU power, quantifiable hardware capabilities) of that computer. However, programs running inside a container may only see the container's contents and devices assigned to the container. Thus, containers may be isolated against each other similar to the isolation of virtual machine against each other. The here proposed concept may be implemented advantageously with Docker container.

In the following, a detailed description of the figures will be given. All instructions in the figures are schematic. Firstly, a block diagram of an embodiment of the inventive computer-implemented method for creating a secure software container is given. Afterwards, further embodiments, as well as embodiments of the secure container system for creating a secure software container, will be described.

FIG. 1 shows a block diagram of an embodiment of the computer-implemented method 100 for creating a secure software container, e.g., a secure Docker container. The method may comprise providing, 102, a first layered software container image, in particular an image comprising layers that are "delta based", i.e., based on thin-provisioning.

The method 100 comprises further transforming, 104, all files, except corresponding metadata of each layer of the first layered software container image into a volume, in particular, a volume comprising a file system. The volume comprises a set of blocks—in particular the blocks managed by a storage disk—wherein each layer comprises an incremental difference to a next lower layer. It may also be mentioned that the metadata are in particular all those metadata required describing how to deal with the container, i.e., how the different layers relate to each other.

Additionally, the method 100 comprises encrypting, 106, each block of the set of blocks of a portion of the layers. This may be performed by using an encryption key known only to the creator of the secured container. It may also be noted that not all layers have to be encrypted. In particular those layers that are identical for all software containers may not need an encryption. An example may be the basic operating system layer, e.g., an "Ubuntu layer".

Furthermore, the method 100 comprises storing, 108, each encrypted set of the blocks and—in particular represented as a file—as a layer of an encrypted container image, along with unencrypted metadata (e.g., with pointers to parent layers) for rebuilding an order of the set of blocks equal to an order of the first layered software container image. This may then result in the same number of block devices as the number of layers of the original software container, i.e., the first layered software container image. Thereby, a secure encrypted layered software container is created.

FIG. 2 shows a block diagram 200 of the transformation process from the unencrypted software container 202 to the encrypted software container storable in a container library. The first layered software container image 202, also shown as individual layers 204, is transformed to the secure software container 208 also comprising different layers 210. The conversion is performed using a conversion tool 206 and indicated by the bowed arrow 206a. The software container 202 is unencrypted, while the secure software container 208 has encrypted layers 210. These may be stored in a container repository 212. Also here, secure software containers 208 with a layer 210 are shown, one example with layers 210 in symbolic form.

FIG. 3 shows a block diagram of an embodiment of a complete stack 300 of involved elements for executing the secure software container 208. Based on a secure execution platform for virtual machines 302—or alternatively, secure container execution environment that runs containers in virtual machines—a container engine 304 manages basic requirements for operating software containers. For completeness reasons, the secure software container 208 (not explicitly shown) with its layers 210, in particular with a top read/write layer and in encrypted form (e) is shown. This container engine 304 calls the container runtime environment 306, comprising a hypervisor 308. The hypervisor 308 then starts the kernel 310—in particular the operating system kernel—in a layer of the software container 208. The arrow 312 may indicate the movement of the secure software container 208 with the layers 210 from the container engine into the virtual machine 314, where it is decrypted into the decrypted form of layers 204 of the executable, decrypted (d) container layer stack 204 (*d*) (not explicitly shown).

It may be noted that the virtual machine 314 is a trusted environment, if technology for a secure execution of the virtual machine, like a usage of a hardware security module, or any other technology to run virtual machines so that privileged hypervisor administrators—e.g., root users—may have not access to the virtual machine's data may be applied.

FIG. 4 illustrates thin-provisioning and the linking of blocks in the secure software container. The layers 402, 404, 406, 408 on the top left side (FIG. 4(*a*)) may be a sequence of layers of a software container image. The lowest layer 402 comprises a file 410 A and the next upper layer 404 comprises a file 412 B. If file 410 A is updated (changed), it is written to a new layer 406 as file 414 A'. At this point in time, the layer 406 may be the top layer allowing a read and especially a write access to the layers 406. The complete, original content of the software container can be recognized in 408 which basically represents a vertical view through the different layers, starting via the top layer 406 going via layer 414 to layer 402.

On the top right side (FIG. 4(*b*)) a mapping into spares block devices 416, 418, 420, 422 is illustrated. The black boxes shown in the different layers may represent blocks that carry data of the layers 402, 404, 406 in spares block devices and may be encrypted with the client key. Thus, the stack of FIG. 4(*b*) may represent data of the secure software container. All encrypted block device files are written as files into a corresponding new container layer. These layers can contain three files. Their automatically generated names are based on a hash of the corresponding content of the file: (i) a content file (the block-wise encrypted spares block loopback device files), (ii) a parent file, just comprising the hash of the previous layer (i.e., pointing to the file name of the previous layer), (iii) a metadata file (this may be optional), comprising container image metadata added to the related layer, like environmental variables, port settings, etc. This last file may also optionally be encrypted.

If all layers are mounted on top of each other, all files will be visible. The sum parent firewall describes the dependency graph of the layers which allows mounting the block device file on top of one another in the right order. This is shown in FIG. 4(*c*). The bowed arrows show the pointing function of the hash address of the respective parent layer.

FIG. 5 shows an embodiment of a first part of a flowchart 500 to form the secure software container. Firstly, a spares loopback device file is created, 502. Then, a file system is created in the loopback device file, 504. Starting from the bottom of the layers of the software container, a next layer "L" of the first (original) layered software component's image is identified before a spares loopback device file "D" is created, 508. A device mapper is used to add loopback device file "D" on top of the previous stack of loopback device files, 510. Thus, write operations will go to "D" and all read operation requests for it through the stack of layers until a block is found at the requested offset (compare 512).

Then, a mount operation for the stack of loopback device files at a mount point is performed, 514. Next, all contents of "L" is added to the mount point (which will write these changes to "D"), 516. Last but not least, the mount point is unmounted, 518. The steps 506 to 518 are performed for all image layers.

FIG. 6 shows an embodiment of the second part 600 of the flowchart 500 of FIG. 5 to form the secure software container. The flowchart continues with an identification 602 spares loopback device for "D", and thereby starting from the bottom-most layer. Then, "D" is encrypted and an encrypted version "E" is created of "D", 604. This is done for all image layers, as indicated by the loopback arrow on the left side of the flowchart.

Then, a spares loopback device file "D2 is identified; also here the process starts from the bottom-most layer (606). Next, a hash value "H" of "E" is created, 608. In a next step, again, starting from the bottom-most layer, an identification according to the original image layer "L" is performed, 610. At 612, a new container image layer "M" is created on top of any existing new container image layers. Then, a file in "M" is created, 614 by putting content of "E" into a new file called "H"-content. And, a file in "M" is created, 616, by putting any metadata information of "L" into the new file "H"-metadata.

Next, it is determined, 618, whether "L" is the bottom-most layer. If that is not the case ("N"), the file in "M" is created, 620, by putting the previous hash value (i.e., previous "H" of previous "E") into a new file called "H"-parent. If the determination 618 is true—case "Y"—the process loops back to step 606 of identifying sparse loopback device file "D" and repeats this loop for all image layers.

FIG. 7 shows an embodiment of a first part of flowchart 700 for an execution of the secure software container. Initially, the container engine of the host mounts, 702, all layers "E" on top of one another to assemble the container file system. In a next step, the content engine in the host mounts, 704, empty read/write to the container file system. Then, the container file system creates, 706, a "secure execution" virtual machine before the file system is provided, 708, to the virtual machine. The container engine reads, 710, a user-provided kernel and commands like initrd, init and a client key to decrypt the encrypted software container, i.e., its content.

The VM boots, 712, the user-provided kernel/initrd ("initrd" stands for initial RAM disk which is a temporary file system used by the Linux kernel during the boot process), and starts 714, the user-provided init process, i.e., the initiation process/command. The flowchart then continues on FIG. 8.

FIG. 8 shows an embodiment of the second portion 800 of the flowchart 700 (compare FIG. 7) for an execution of the secure software container. The init process re-creates, 802, the order of layers, based on "H"-parent files, and the init process decrypts, 804, all "H"-content files on the fly (e.g., using "dm-crypt", a crypto-module of the device mapper of the Linux kernel) with the user-provided client key. Furthermore, the init process assembles, 806, decrypted sparse loopback devices in the right order, and assembles, 808, read-write a sparse loopback device file on top of all other layers which are read-only.

Additionally, the init process encrypts, 810, read-write a loopback file as a new "H"-content file, again using the client-provided decryption key. Last but not least, the init process encrypts, 812, a new "H"-parent file pointing to the top-most read-only layer.

For completeness reasons, FIG. 9 shows a block diagram of an embodiment of the secure container system 900. The system 900 comprises a receiving unit 902 adapted for receiving a first layered software container image, and a transformation unit 904 adapted for transforming all files, except corresponding metadata, of each layer of the first layered software container image into a volume comprising a set of blocks, wherein each layer comprises an incremental difference to a next lower layer.

Additionally, the system 900 comprises an encryption module 906 adapted for encrypting each block of the set of blocks of a portion of the layers, and a storage unit 908 adapted for storing each encrypted set of the blocks as a layer of an encrypted container image along with unencrypted metadata for rebuilding an order of the set of blocks equal to an order of the first layered software container image. Thereby, a secure encrypted software container is created.

Embodiments of the invention may be implemented together with virtually any type of computer, regardless of the platform being suitable for storing and/or executing program code. FIG. 10 shows, as an example, a computing system 1000 suitable for executing program code related to the proposed method.

The computing system 1000 is only one example of a suitable computer system, and is not intended to suggest any limitation as to the scope of use or functionality of embodiments of the invention described herein, regardless, whether the computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couple various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the invention.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the invention, as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of the computer system/server 1000 via bus 1006. It should be understood that, although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

Additionally, the secure container system 900 for creating a secure software container may be attached to the bus system 1006.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

As a summary of the above, the invention's general concept may be describes in a series of clauses:

1. According to a first clause, there is a computer-implemented method for creating a secure software container provided; the method comprising
   providing a first layered software container image,
   transforming all files, except corresponding metadata, of each layer of the first layered software container image into a volume, the volume comprises a set of blocks, wherein each layer comprises an incremental difference to a next lower layer,
   encrypting each block of the set of blocks of a portion of the layers,
   storing each encrypted set of the blocks as a layer of an encrypted container image, along with unencrypted metadata for rebuilding an order of the set of blocks equal to an order of the first layered software container image,
   thereby creating a secure encrypted software container.
2. The method according to clause 1, wherein the storing each encrypted set of the blocks also comprises
   storing metadata of the first layered software container image.
3. The method according to clause 1 or 2, wherein each of the layers stored in the encrypted container image applies thin-provisioning also comprises thin-provisioning metadata.
4. The method according to any of the preceding clauses, wherein a name of each file of the layer of the encrypted container image is a hash value of content of the file.
5. The method according to any of the preceding clauses, also comprising
   providing a virtual machine operating system, a start program and a decryption key, the decryption key corresponding to an encryption key used for the encrypting each block of the set of blocks.
6. The method according to clause 5, also comprising
   providing a secure container execution environment enabled for a starting of the virtual machine with the virtual machine operating system.
7. The method according to clause 6, wherein the starting of the virtual machine comprises
   decrypting the encrypted container image's set of blocks using the decryption key.
8. The method according to clause 7, also comprising
   rebuilding the first layered software container image in the sequence of layers of the first layered software container image.
9. The method according to clause 8, wherein a layer on top of the decrypted secure container image allows read/write access wherein the layers below the top layer allow a read-only access.

10. The method according to clause 5 to 9, wherein the secure container execution environment is protected by a secure firmware preventing access to the virtual machine by privileged users and/or other processes, and wherein the virtual machine operating system, the start program and the decryption key are each encrypted.

11. The method according to clause 10, wherein the secure firmware cooperates with a hardware security module.

12. Also, a secure container system for creating a secure software container is provided; the system comprising
a receiving unit adapted for receiving a first layered software container image,
a transformation unit adapted for transforming all files, except corresponding metadata, of each layer of the first layered software container image into a volume, the volume comprises a set of blocks, wherein each layer comprises an incremental difference to a next lower layer,
an encryption module adapted for encrypting each block of the set of blocks of a portion of the layers,
a storage unit adapted for storing each encrypted set of the blocks as a layer of an encrypted container image along with unencrypted metadata for rebuilding an order of the set of blocks equal to an order of the first layered software container image, thereby creating a secure encrypted software container.

13. The system according to clause 12, wherein the storage unit is also adapted for
storing metadata of the first layered software container image.

14. The system according to clause 12 or 13, wherein each of the layers stored in the encrypted container image uses thin-provisioning also comprises thin-provisioning metadata.

15. The system according to any of the clauses 12 to 14, wherein a name of each file of the layer of the encrypted container image is a hash value of content of the file.

16. The system according to any of the clauses 12 to 15, also comprising a providing module adapted for
providing a virtual machine operating system, a start program and a decryption key, the decryption key corresponding to an encryption key used for the encrypting each block of the set of blocks.

17. The system according to clause 16, wherein the providing module I also adapted for
providing a secure container execution environment enabled for a starting of the virtual machine with the virtual machine operating system.

18. The system according to clause 17, wherein the starting of the virtual machine comprises
decrypting the encrypted container image's set of blocks using the decryption key.

19. The system according to clause 18, also comprising
a rebuilding unit adapted for rebuilding the first layered software container image in the sequence of layers of the first layered software container image.

20. The system according to clause 19, wherein a layer on top of the decrypted secure container image allows read/write access wherein the layers below the top layer allow a read-only access.

21. The system according to any of the clauses 16 to 20, wherein the secure container execution environment is protected by a secure firmware preventing access to the virtual machine by privileged users and/or other processes, and wherein the virtual machine operating system, the start program and the decryption key are each encrypted.

22. The system according to clause 21, also comprising a hardware security module adapted for cooperating with the secure firmware.

23. A computer program product for creating a secure software container, the computer program product comprising a computer readable storage medium having program instructions embodied therewith, the program instructions being executable by one or more computing systems or controllers to cause the one or more computing systems to
provide a first layered software container image,
transform all files, except corresponding metadata, of each layer of the first layered software container image into a volume, the volume comprises a set of blocks, wherein each layer comprises an incremental difference to a next lower layer,
encrypt each block of the set of blocks of a portion of the layers,
store each encrypted set of the blocks as a layer of an encrypted container image along with unencrypted metadata for rebuilding an order of the set of blocks equal to an order of the first layered software container image,
thereby creating a secure encrypted software container.

What is claimed is:

1. A computer-implemented method for creating a secure software container, said method comprising:
providing a first layered software container image;
wherein each layer contains three files, a content file, a parent file hash and a metadata file;
transforming all files, except corresponding metadata, of each layer of said first layered software container image into a volume, said volume comprises a set of blocks, wherein each layer comprises an incremental difference to a next lower layer;
encrypting each block of said set of blocks of a portion of said layers; and
storing each encrypted set of said blocks as a layer of an encrypted container image, along with unencrypted metadata for rebuilding an order of said set of blocks equal to an order of said first layered software container image, thereby creating a secure encrypted software container.

2. The method according to claim 1, wherein said storing each encrypted set of said blocks also comprises:
storing metadata of said first layered software container image.

3. The method according to claim 1, wherein each of said layers stored in said encrypted container image applies thin-provisioning also comprises thin-provisioning metadata.

4. The method according to claim 1, wherein a name of each file of said layer of said encrypted container image is a hash value of content of said file.

5. The method according to claim 1, further comprising:
providing a virtual machine operating system, a start program and a decryption key, said decryption key corresponding to an encryption key used for said encrypting each block of said set of blocks.

6. The method according to claim 5, further comprising:
providing a secure container execution environment enabled for a starting of said virtual machine with said virtual machine operating system.

7. The method according to claim 6, wherein said starting of said virtual machine comprises:
decrypting said encrypted container image's set of blocks using said decryption key.

8. The method according to claim 7, further comprising:
rebuilding said first layered software container image in said order of layers of said first layered software container image.

9. The method according to claim 8, wherein a layer on top of said decrypted secure container image allows read/write access wherein said layers below said top layer allow a read-only access.

10. The method according to claim 5, wherein said secure container execution environment is protected by a secure firmware preventing access to said virtual machine by privileged users and/or other processes, and wherein said virtual machine operating system, said start program and said decryption key are each encrypted.

11. The method according to claim 10, wherein said secure firmware cooperates with a hardware security module.

12. A secure container system for creating a secure software container, said system comprising:
a computer system comprising, a processor, a computer readable storage medium, and program instructions stored on the computer readable storage medium being executable by the processor to cause the computer system to:
provide a first layered software container image;
wherein each layer contains three files, a content file, a parent file hash and a metadata file;
transform all files, except corresponding metadata, of each layer of said first layered software container image into a volume, said volume comprises a set of blocks, wherein each layer comprises an incremental difference to a next lower layer;
encrypt each block of said set of blocks of a portion of said layers; and
store each encrypted set of said blocks as a layer of an encrypted container image along with unencrypted metadata for rebuilding an order of said set of blocks equal to an order of said first layered software container image, thereby creating a secure encrypted software container.

13. The system according to claim 12, wherein said storing each encrypted set of said block also comprises:
storing metadata of said first layered software container image.

14. The system according to claim 12, wherein each of said layers stored in said encrypted container image uses thin-provisioning also comprises thin-provisioning metadata.

15. The system according to claim 12, wherein a name of each file of said layer of said encrypted container image is a hash value of content of said file.

16. The system according to claim 12, also comprising:
providing a virtual machine operating system, a start program and a decryption key, said decryption key corresponding to an encryption key used for said encrypting each block of said set of blocks.

17. The system according to claim 16, further comprising:
providing a secure container execution environment enabled for a starting of said virtual machine with said virtual machine operating system.

18. The system according to claim 17, wherein said starting of said virtual machine comprises:
decrypting said encrypted container image's set of blocks using said decryption key.

19. The system according to claim 18, further comprising:
rebuilding said first layered software container image in said order of layers of said first layered software container image.

20. The system according to claim 19, wherein a layer on top of said decrypted secure container image allows read/write access wherein said layers below said top layer allow a read-only access.

21. The system according to claim 16, wherein said secure container execution environment is protected by a secure firmware preventing access to said virtual machine by privileged users and/or other processes, and wherein said virtual machine operating system, said start program and said decryption key are each encrypted.

22. The system according to claim 21, wherein said secure firmware cooperates with a hardware security module.

23. A computer program product for creating a secure software container, said computer program product comprising a computer readable storage medium having program instructions embodied therewith, said program instructions being executable by one or more computing systems or controllers to cause said one or more computing systems to:
provide a first layered software container image;
wherein each layer contains three files, a content file, a parent file hash and a metadata file;
transform all files, except corresponding metadata, of each layer of said first layered software container image into a volume, said volume comprises a set of blocks, wherein each layer comprises an incremental difference to a next lower layer;
encrypt each block of said set of blocks of a portion of said layers; and
store each encrypted set of said blocks as a layer of an encrypted container image along with unencrypted metadata for rebuilding an order of said set of blocks equal to an order of said first layered software container image, thereby creating a secure encrypted software container.

24. The computer program product of claim 23, wherein each of said layers stored in said encrypted container image applies thin-provisioning also comprises thin-provisioning metadata.

25. The computer program product of claim 23, wherein a name of each file of said layer of said encrypted container image is a hash value of content of said file.

* * * * *